April 19, 1966 T. R. HODGKINS 3,246,773
STICK STACKING APPARATUS
Filed May 29, 1963 3 Sheets-Sheet 3

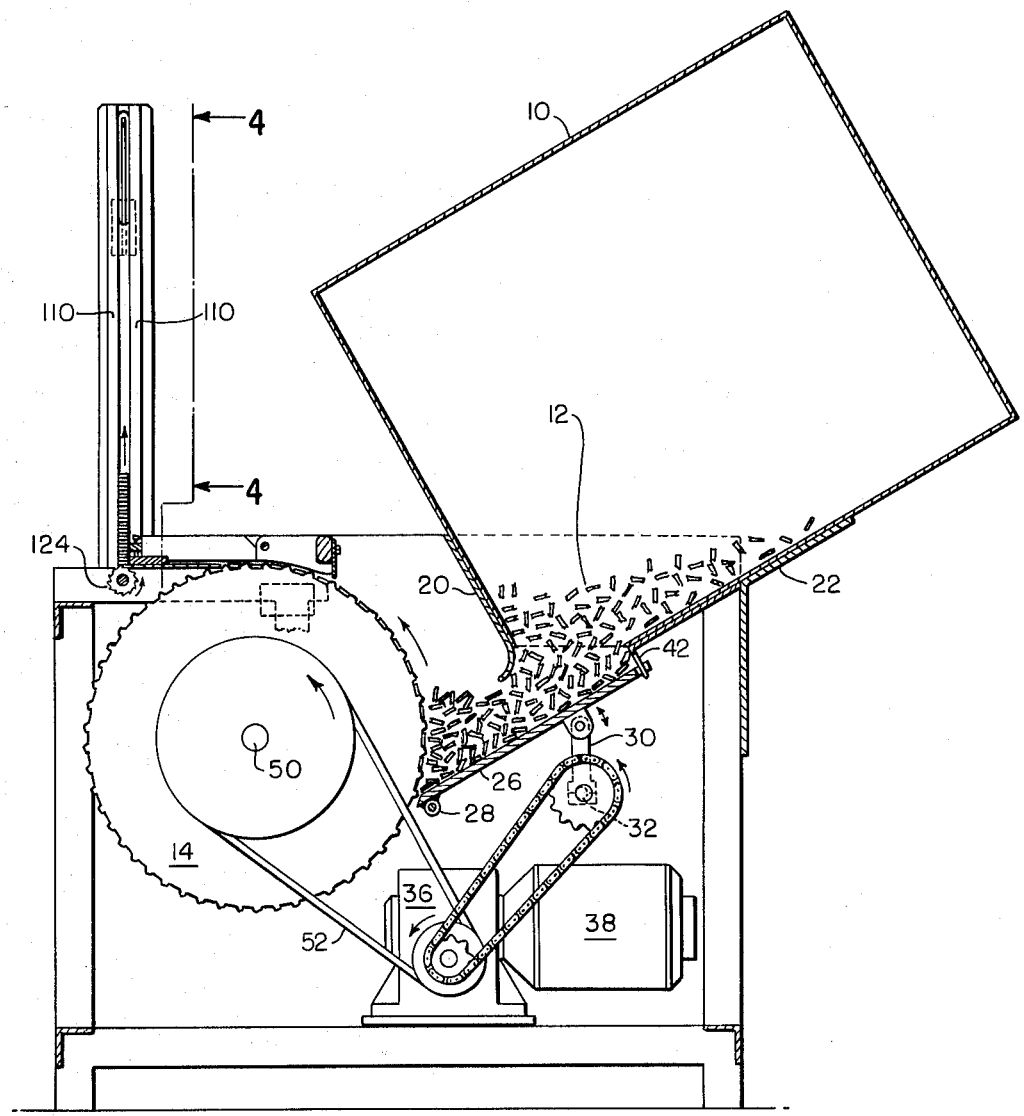
FIG. I
INVENTOR.
THEODORE R. HODGKINS

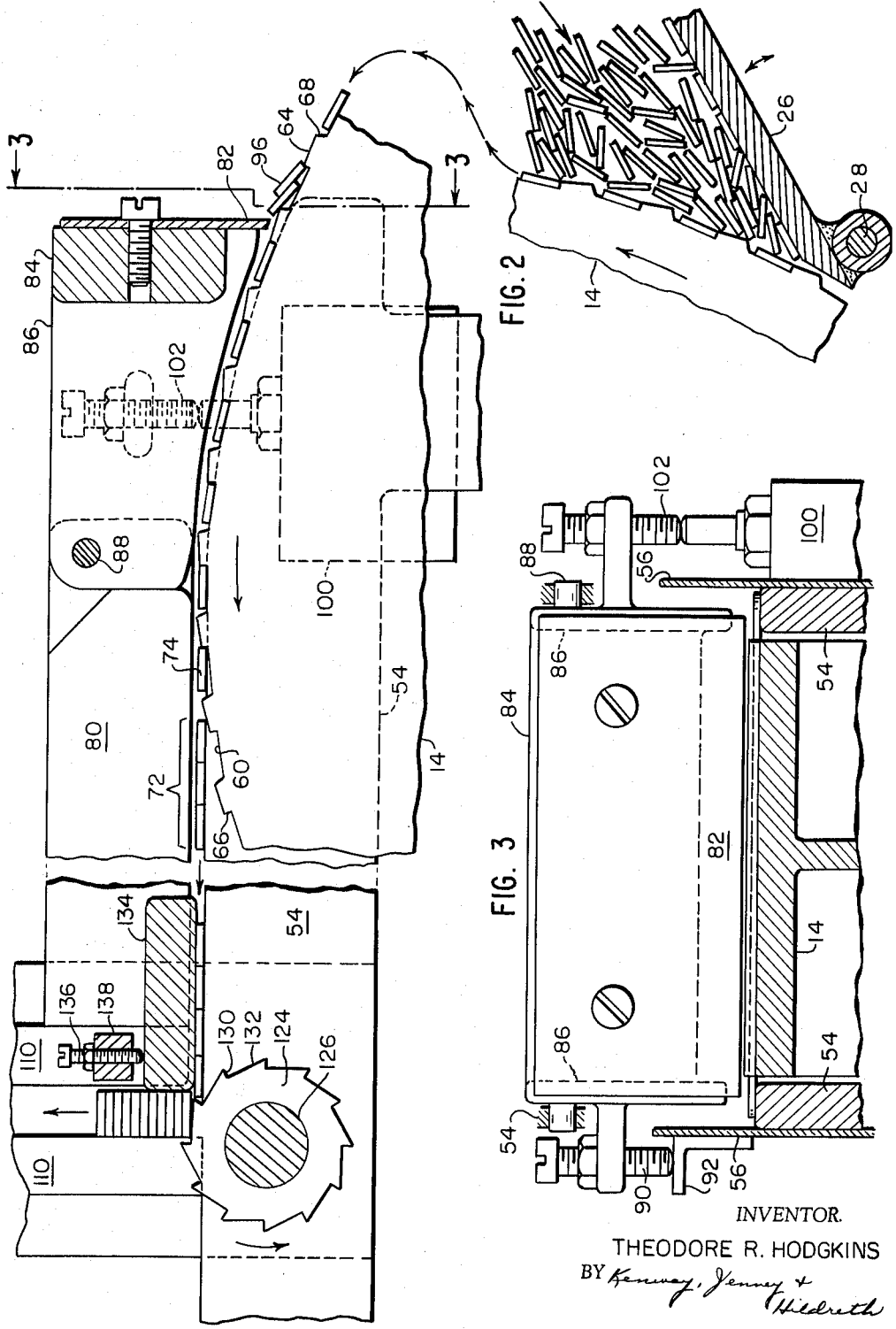

INVENTOR.
THEODORE R. HODGKINS
BY Kenway, Jenney &
Hildreth
ATTORNEYS

United States Patent Office 3,246,773
Patented Apr. 19, 1966

3,246,773
STICK STACKING APPARATUS
Theodore R. Hodgkins, Wilton, Maine, assignor to Forster Mfg. Co., Inc., Wilton, Maine, a corporation of Maine
Filed May 29, 1963, Ser. No. 284,070
6 Claims. (Cl. 214—6)

The present invention relates to stacking apparatus, and more particularly to apparatus for stacking ice cream sticks and the like.

In the manufacture of frozen confections, it is customary to freeze the confection around one end of a flat wooden stick a few inches in length, to provide a handle. In such machinery, the sticks are fed in succession from stacks where the sticks have been placed in pre-oriented bundles. Such bundles may have been prepared at the site of the stick manufacture, with the sticks accurately aligned and in face to face relation and secured in bundles by suitable wrappers for shipment in bulk to the site of the confection-making machinery.

To obviate the necessity for stacking and wrapping sticks in bundles and packing the bundles in cartons for shipment, the present invention has as an object the provision of apparatus suitable for use at the site of manufacture of ice cream and other frozen confections whereby parallel but otherwise randomly oriented unwrapped sticks received in cartons or other shipping containers may be rapidly and automatically transferred from the carton or container and stacked in aligned face to face relation in storage means, from which the stacked sticks may readily be transferred to the confection making machine in unwrapped bundles or groups so as to provide a supply of stacked sticks for the confection making machine in a simple and economical manner.

In accordance with this and other objects, a feature of the invention involves the provision of a stacking machine which is adapted to receive an opened carton of loose generally parallel ice cream sticks or the like, to transfer and properly orient in rapid sequence the sticks discharged from the carton and to assemble the properly oriented sticks in face to face relation in a storage stack from which groups or bundles of unwrapped sticks may periodically be removed and transferred to the stick storage element of the confection making machine to meet the supply requirement thereof.

More particularly, the stacking machine of the present invention is provided with novel devices for minimizing jamming due to misalignment or to improper feeding, for stopping the machine in the event a jam should occur, and for automatically controlling the operation of the machine so that the stacking proceeds whenever the stacked stick storage is not completely full.

In the drawings illustrating the invention according to its preferred embodiment, FIG. 1 is a view in side elevation, partly in section, illustrating the general arrangement of the machine and its operating instrumentalities.

FIG. 2 is an enlarged sectional elevation of the apparatus in the region of the sorting, transferring and stick stacking instrumentalities.

FIG. 3 is a detail view in elevation, partly in section, taken on the line 3—3 of FIG. 2.

Figure 4:
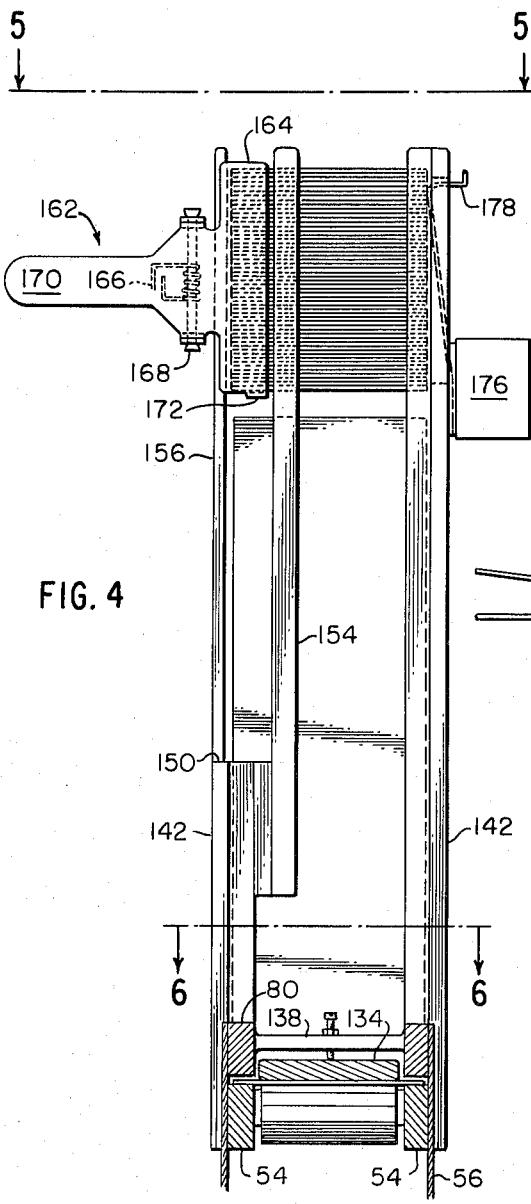
FIG. 4 is a view in elevation of the storage stack portion of the machine, taken according to the line 4—4 of FIG. 1.

As has been indicated, the machine is adapted to receive generally parallel but otherwise randomly oriented sticks directly from a carton in which the sticks are shipped. According to the showing of FIG. 1, a carton 10 of loose parallel sticks 12 serves as the reservoir or supply for the stacking instrumentalities. By cutting or tearing away a corner of the carton and then placing the carton in the machine in inverted position as shown with the open corner at the bottom, the sticks are automatically supplied by gravity to the sorting and feed drum 14 in generally parallel relation to the axis of rotation of the drum.

The carton of sticks is supported within the machine in the desired oblique position by means of supports 20 and 22 extending transversely of the machine in the region of its upper right hand corner, as viewed in FIG. 1. The two members 20 and 22 are disposed in mutually spaced right angle relation to one another to form an open trough for the discharge of sticks through the open corner of the shipping carton.

To facilitate the discharge of sticks from the carton and to insure that the sticks will freely move into contact with the feed drum 14, an oscillating plate 26 is arranged to receive the sticks discharged from the carton. This plate is obliquely disposed to provide a surface that slopes downwardly toward the drum, and is slowly raised and lowered to agitate the sticks, particularly those collected at and below the open corner of the carton, and thereby minimize any tendency of the sticks to become immobilized within the opening.

To this end, the plate 26 is pivotally supported at 28 adjacent its lower edge and close to the periphery of drum 14. A link 30 pivotally connected at its upper end to the plate is reciprocated by an eccentric 32 which is rotated at slow speed by chain and sprocket connections or equivalent driving means from a speed reducer 36 and motor 38 which also provides the motive power for the feed drum. To prevent spillage of sticks over the upper end of the plate during its oscillations, pins 42 project downwardly from carton support member 22 and extend through apertures in the plate adjacent its upper edge.

The feed drum 14 by which the sticks from the carton are removed from the mass and fed one at a time to the stacking rechanism is mounted on cross shaft 50 journalled in suitable bearings, not shown, and slowly rotated in counterclockwise direction as viewed in FIG. 1 by belt 52 from speed reducer 36. The drum may be of appreciable diameter, for example in excess of eighteen inches, while its width is preferably somewhat less than the length of the sticks which it is to feed. As shown in FIG. 3 the drum width is such that the ends of the sticks project a quarter inch or more, to permit engagement of the ends of the sticks with the fixed rails 54 between which the drum rotates. Plates 56 outwardly of the rails maintain the sticks properly positioned on the rails as the sticks advance.

The drum 14 is provided with a plurality of spaced transverse slots 60 around its periphery which are adapted to receive individual sticks from the pile on the oscillating plate 26 and transfer them one at a time to the rails 54. As best shown in FIG. 2, the slots have a depth approximating the thickness of the sticks, and width peripherally of the drum slightly greater than the stick width so that the sticks may freely enter the slots. The tooth portions 64 of the drum intermediate the slots may be narrower in a peripheral direction than the slot width, and are preferably somewhat asymmetrical with respect to a radius from the drum axis through their centers.

As will be seen from an inspection of the profile of slots and teeth in FIG. 2, the leading edge 66 of each tooth is substantially radially aligned and generally perpendicular to the base of the slot, while the trailing edge 68 of each tooth is forwardly raked from base to tip. Furthermore each tooth at its leading edge is approximately flush with the outer surface of a stick when in the slot, while the tooth adjacent its trailing edge projects outwardly a slight amount beyond the surface of the stick, thereby minimizing the likelihood that a stick, once it has been properly seated in a slot, will be dislodged by the action of another stick.

The action of the drum in removing sticks from the stack at the intersection of the drum and oscillating sloping plate 26 is illustrated in the lower right hand portion of FIG. 2. The effect of the drum rotation in an upward direction past the sticks being urged against the drum periphery by the sloping plate is to produce a tumbling action on the adjacent sticks that effectively tends to align the sticks in parallel relation to the slots and causes sticks that are in flatwise relation to the drum periphery to enter any unfilled slots. Due to the wiping action provided by the sticks in the mass, the sticks in the slots are held in place until they have reached a point above a horizontal line through the center of the drum, after which they remain in the slots by the action of gravity.

Adjacent the top of the drum the sticks are removed from the slots and transferred to the rails 54 which engage the projecting ends of the sticks. The rails are shaped with curving surfaces corresponding generally to the curvature of the drum in the region where the drum periphery approaches its highest point. Thereafter the rails extend horizontally toward the stacking section of the machine. In the region of transition of the rails from curved to tangential and horizontal, the advance of the stick ends along the top edges of the rails results in lifting the sticks from the slots as the drum continues its rotation.

The sticks, upon being lifted from the slots by the tangential disposition of the guide rails 54 relative to the drum periphery, are brought into edge to edge contact with one another while supported on the rails, as indicated generally at 72 in FIG. 2. It will be observed that the following stick 74 has started to lift from its slot while being carried forward by the tooth that engages its trailing edge, and is about to be carried into engagement with the stick just ahead before the drum loses driving contact.

To maintain the sticks in edge to edge relation without buckling upwardly or overlapping, fixed upper guide rails 80 are provided above the lower rails 54. These upper rails are positioned to define a gap between which a single stick may freely slide, but which will not accept two sticks at a time one above the other.

The admission of more than one stick at a time to the passageway between upper and lower guide rails is prevented by a top shoe device having a blade 82 in the nature of a doctor blade. The device comprises a cross member 84 to which the blade is secured in a position transversely of the drum, and integral side arms 86 pivotally connected at 88 to the fixed upper rails 54. The underside of the arms is curved to conform generally to the periphery of the drum while maintaining a spacing from the curved lower rails 54 comparable to the spacing in the straight region of upper and lower rails. A stop screw 90 at one side of the device engages a fixed abutment 92 to permit adjusting the heightwise position of the blade 82 so that its lower edge just clears the tips of the teeth 64 of the drum. The action of the blade is to intercept any sticks that are improperly seated in the drum, for example any double sticks such as typified at 96 in FIG. 2. The blade will normally dislodge the advancing improperly positioned stick or sticks from the drum by simple wiping action. If, however, any sticks are so positioned as to catch and not be freely dislodged by the blade, the top shoe device will rock upwardly about its pivot when engaged by the stick. Such upward rocking movement is arranged to stop the machine through the provision of a switch 100 in the motor circuit which is normally held closed by adjustable screw 102 bearing against the switch actuator and carried by the side arm 86 of the top shoe device. By this arrangement, any improperly positioned or double sticks that are not readily dislodged by the doctor blade are prevented from becoming jammed at the entrance to the passage between the fixed upper and lower guide rails. When the machine stops, the shoe may be lifted by the operator to expose the top of the drum and permit the sticks to be removed that caused the safety stop mechanism to be actuated.

Under the influence of the sticks being fed into the guideway between upper and lower guide rails 80 and 54 from the rotating drum, the sticks are advanced into the vertical stacking section for stacking in face to face relation. To transfer the sticks from their edge to edge horizontal relation into the desired face to face stack within vertical guides 110, means are provided for automatically raising the stack in stepwise fashion and for successively sliding the advancing sticks into vertically aligned position at the bottom of the stack.

The means employed to remove the sticks from the horizontal guideway comprises a rotatable ratchet-like member 124 which is secured to a shaft 126 journalled between the side rails 54 of the unit. It is a feature of the invention that the ratchet 124 is not driven by independent driving means but is actuated solely by the sticks as they advance along the guideway into engagement with the ratchet teeth. The teeth are of typical ratchet configuration, each tooth having a step 130 generally radially disposed with respect to the shaft axis and an inclined surface 132 extending from the outer extremity of one step to the base of the next adjoining step.

The ratchet member 124 is positioned with its center of rotation below the top edge of the guide rails 54 a distance such that when the inclined surface at the top of the ratchet is substantially parallel to the rails, the leading edge of the entering stick engages the tooth or step that follows said inclined surface. As a consequence, the normal advance of the sticks along the guideway will cause the foremost stick to rotate the ratchet in a counterclockwise direction, causing the stick to be taken up on the inclined surface and carried beneath the stack of sticks within the vertical stacking passage between guides 110.

As seen in FIG. 2, the position of the ratchet below and slightly to the forward side of the centerline of the vertical stacking passage allows an approaching stick to engage the radial surface 130 of a tooth. As the edge to edge aligned sticks advance, the stick will pass onto the surface 132 of the ratchet 124 and will assume the position of the stick at the bottom of the stack. It will be noted that this newly arrived stick has been displaced upwardly approximately one stick thickness as a result of the advance of the ratchet member by one tooth. As the ratchet 124 rotates and receives each stick, the stack of sticks will be raised by the camming action of the tooth in advance of the stick. This action results in lifting the entire stack of sticks one stick thickness per tooth to permit the next following stick to be inserted at the bottom. In this fashion the sticks advancing to the stacking station from the guideway are sequentially transferred into flatwise relation in a vertical stack.

It should be especially observed that the ratchet 124 is not driven by independent means but is advanced solely by the forward movement of the sticks along the guideway, as a consequence of the feeding action of the drum in introducing a stick into the guideway. By use of this structure the device is essentially jam proof in that the ratchet is automatically actuated in proper timed relation to the advancing stick, with no problem of synchronism of the rotation of separate instrumentalities.

To aid in insuring proper entry of the sticks from the guideway onto the ratchet member, a plate 134 of rectangular configuration is disposed between the upper guide rails 80 at the end of the guideway adjacent the ratchet, as shown in FIGS. 2 and 4. By reason of the weight of the plate which rests upon the three or four sticks beneath it, the sticks adjacent the ratchet are restrained from jumping under the influence of the action of the ratchet in lifting the sticks out of the guideway and sliding them into the vertical stack. Upward movement of the plate 134 is controlled by an adjusting screw 136 mounted in cross-bar 138 extending between guide rails 80.

The vertical stick receiving portion of the unit, shown particularly in FIG. 4, is of considerable height in order that a substantial number of sticks may be stacked therein, ready for transfer to the stick storage trays or guideways in the machine wherein the frozen confections are made. As has been indicated, the vertical members 110 are spaced to define a guideway bridged across the ends of the sticks by plates 142.

To enable a group of stacked sticks readily to be removed from the vertical storage guideway without the need of wrapping or tying, the upper portion of the vertical guideway is constructed to expose the ends of the sticks for gripping by a special tool. As shown in FIG. 4, one of the end plates 142 and the associated guide members 110 terminate at 150 substantially below the top of the storage structure and from this point to the top the guiding of the sticks is provided by inwardly disposed guides 154 and a relatively narrow end stop 156 (see the top plan view, FIG. 5). Thus the projecting ends of the sticks are freely accessible for gripping by the stick removing tool indicated generally at 162.

Figure 5:
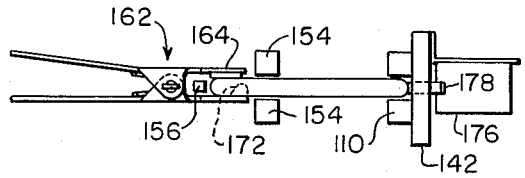
FIG. 5 is a top view of the storage stack, showing the tool for withdrawing a bundle of sticks, taken according to the line 5—5 of FIG. 4.
Figure 6:
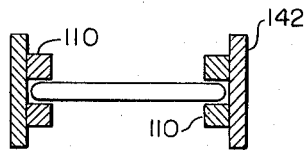
FIG. 6 is a sectional view of the storage stack, taken on the line 6—6 of FIG. 4.

As shown in FIGS. 4 and 5, the stick removing tool 162 comprises pivoted members having wide jaws 164 which are urged in closed direction by the spring 166 surrounding the pivot shaft 168. Handles 170 enable the jaws to be opened against the spring pressure. One jaw carries a thin projecting lip 172 to project into the stack of sticks and separate the group of sticks to be gripped from the remainder, while the other jaw preferably is provided with a resilient pad to insure that all sticks are frictionally gripped. It will be observed that the jaw construction and the relation of the pivot connection between jaws is such that the jaws extend around the end stop 156 and engage substantially the entire extent of the edges of the sticks projecting beyond the guides 154. As the storage guideway is open at the top, the group of sticks gripped by the tool is readily lifted out of the guideway and placed in the stick-receiving rack or guideway of the confection-making machine.

To control the operation of the machine so that the storage stack may continuously be supplied with sticks whenever the stack is less than full, means are provided for stopping the drive motor when the stick supply reaches the top of the vertical guideway, and for restarting the drive motor whenever the height of the stack is below the top. A switch 176 mounted on one of the end plates 142 of the vertical guideway is provided with a feeler arm 178 which projects through an aperture in the plate into the path of the sticks. The switch is connected in series with the motor circuit so that whenever the stack reaches the top, the feeler arm is displaced outwardly, as viewed in FIG. 4, to open the switch and stop the motor. Upon removal of a group of sticks by the gripping tool, the feeler moves inwardly, allowing the switch to close and the motor to resume operation until the stack is again filled.

There has thus been described and illustrated a machine which, utilizing relatively simple operating instrumentalities, is effective to stack in a vertical column thin flat sticks from a pile or mass of generally parallel but otherwise randomly oriented sticks. By introducing the sticks from the opened container onto a sloping oscillating plate adjacent an upwardly rotating peripherally slotted drum, the gradual alignment of the sticks takes place in this region while properly aligned sticks are picked up by the grooves and advanced toward the stacker in edge to edge relation. As a consequence of employing rotary stacking means dependent on the advancing sticks for its operation, actuation of all parts of the machine in proper timed relation is assured since the feed drum is the only positively driven instrumentality in the feeding sequence, aside from the oscillating plate which need not operate in any particular timed relation to the other instrumentalities. By reason of the disposition of the stick-receiving guideway in generally horizontal position at the top of the drum, the sticks need only be carried through approximately a quarter-revolution of the feed drum, and the vertical stacking mechanism may be positioned relatively close to the drum. There thus results a compact machine which nevertheless permits use of a feed drum of considerable diameter. The short guideway for the transfer of sticks from the drum to the ratchet-wheel stacker device minimizes the feed problem, as does the gating means at the entrance to the guideway for removing improperly positioned sticks from the drum and for stopping the machine in the event a jam cannot otherwise be prevented.

I claim as my invention:

1. Apparatus for stacking flat sticks in aligned face to face relation comprising a feed drum having a plurality of spaced transverse slots in its periphery, means for rotating said drum about a generally horizontal axis, means for introducing a mass of generally parallel oriented sticks against the periphery of the drum in an upwardly-rotating region thereof approximately at the height of the drum axis, a guideway generally tangent to the periphery of the drum at the top thereof and having a curving entrance portion conforming generally to the curvature of the drum, said guideway having a passage to receive sticks confined in a single layer in edge to edge contact, a second guideway extending generally perpendicular to and intersecting the first guideway, and means adjacent the intersection of the first and second guideways for intercepting sticks advancing along the first guideway and for diverting them into the second guideway in face to face relation, said means comprising a toothed rotary member having oblique teeth onto which the sticks are fed in succession by the feed drum, said toothed member being rotated solely by the action of the advancing sticks in successive engagement with the teeth of said member.

2. Apparatus for stacking sticks in aligned face to face relation comprising a feed drum having a plurality of spaced transverse slots in its periphery, means for rotating said drum about a generally horizontal axis, means for introducing a mass of generally parallel sticks against the periphery of the drum in an upwardly rotating region thereof, a guideway generally tangent to the drum at the top thereof and having a curved entrance portion generally conforming to the curvature of the drum, said guideway having lower and upper rails separated a distance greater than the thickness of a single stick but less than twice the thickness thereof, the upper rails in the region of the curved portion of the guideway being pivotally mounted for upward swinging movement about a center adjacent the tangential portion of the guideway, a blade member bridging the forward end of the pivotally mounted rails, and adjustable stop means for said rails for limiting downward movement thereof to support the blade member out of contact with single sticks within the drum slots but in intersecting relation to sticks exposed outwardly of the drum periphery.

3. Apparatus for stacking sticks in aligned face to face relation comprising a feed drum having a plurality of spaced transverse slots in its periphery, means for rotating said drum about a generally horizontal axis, means for introducing a mass of generally parallel sticks against the periphery of the drum in an upwardly rotating region thereof, a guideway generally tangent to the drum at the top thereof and having a curved entrance portion generally conforming to the curvature of the drum, said guideway having lower and upper rails separated a distance greater than the thickness of a single stick but less than twice the thickness thereof, the upper rails in the region of the curved portion of the guideway being pivotally mounted for upward swinging movement about a center adjacent the tangential portion of the guideway, a blade member bridging the forward end of the pivotally mounted rails, adjustable stop means for said rails for limiting downward movement thereof to support the blade member out of contact with single sticks within the drum slots but in intersecting relation to sticks exposed outwardly of the drum periphery, and a switch responsive to upward movement of the pivotally mounted rails and blade member to stop the means for rotating the feed drum in the event sticks exposed outwardly of the drum are advanced into the guideway.

4. Apparatus for stacking flat sticks in aligned face to face relation comprising a feed drum having a plurality of spaced transverse slots in its periphery, means for rotating said drum about a generally horizontal axis, means for introducing a mass of generally parallel sticks against the periphery of the drum in an upwardly rotating region thereof approximately at the height of the drum axis, a guideway generally tangent to the periphery of the drum at the top thereof and having a curving entrance portion conforming generally to the curvature of the drum, said guideway having a passage to receive sticks in a single layer in edge to edge contact, a second guideway extending generally perpendicular to and intersecting the first guideway, means adjacent the intersection of the first and second guideways for intercepting sticks advancing along the first guideway and for diverting them into the second guideway in face to face relation, said means comprising a toothed rotary member having oblique teeth onto which the sticks are fed in succession by the feed drum, said toothed member being rotated solely by the action of the advancing sticks, and weight means resting on the sticks within the first guideway adjacent the toothed rotary member to minimize the effect on the following sticks of the operation of said member in removing successive sticks from said first guideway.

5. Apparatus for stacking flat sticks in aligned face to face relation comprising a feed drum having a plurality of spaced transverse slots in its periphery, means for rotating said drum about a generally horizontal axis, means for introducing a mass of generally parallel sticks against the periphery of the drum in an upwardly-rotating region thereof, the slots having a trailing edge substantially radially directed and a leading edge generally oblique to a radial line therethrough, the drum region between adjacent slots being substantially flush with the trailing edge portion of a stick within a slot and projecting radially beyond the stick in the region of the leading edge of the stick, the drum having a width less than the length of the sticks to allow the ends of the sticks to project beyond the drum when carried in the slots, a guideway generally tangent to the periphery of the drum in the region of the top thereof, said guideway having a passage to receive sticks successively from the drum in a single layer in edge to edge relation, and means in the guideway and actuated by the advancing sticks to displace the sticks from the guideway in a direction generally perpendicular to their line of advance along the guideway.

6. Apparatus for stacking flat sticks in aligned face to face relation comprising a feed drum having a plurality of spaced transverse slots in its periphery, means for rotating said drum about a generally horizontal axis, means for introducing a mass of generally parallel sticks against the periphery of the drum in an upwardly rotating region thereof approximately at the height of the drum axis, a guideway generally tangent to the periphery of the drum at the top thereof and having a curving entrance portion conforming generally to the curvature of the drum, said guideway having a passage to receive sticks in a single layer in edge to edge relation, a second guideway extending generally perpendicular to and intersecting the first guideway, means adjacent the intersection of the first and second guideways for intercepting sticks advancing along the first guideway and for diverting them into the second guideway in face to face relation, said second guideway including a portion having spaced rails beyond which the ends of stacked sticks project outwardly, and a member aligned with and adjacent the ends of the sticks and narrower than the width of the sticks to retain the sticks against displacement outwardly between the spaced rails while exposing the side edges of the stacked sticks intermediate the spaced rails and the said member adjacent the ends of the sticks.

References Cited by the Examiner

UNITED STATES PATENTS

| | | | |
|---|---|---|---|
| 1,292,635 | 1/1919 | Parker | 214—6 |
| 1,798,685 | 3/1931 | Kurtenbach | 221—205 X |
| 2,749,120 | 6/1956 | Mallory | 214—6.2 X |
| 2,988,236 | 6/1961 | Shields | 214—6 |
| 2,997,326 | 8/1961 | Daum | 294—16 |
| 3,055,692 | 9/1962 | Kausche | 294—16 |
| 3,086,639 | 4/1963 | Donofrio | 221—201 X |
| 3,122,229 | 2/1964 | Engleson et al. | 214—6.2 X |

GERALD M. FORLENZA, *Primary Examiner.*

HUGO O. SCHULZ, *Examiner.*